United States Patent [19]

Cook

[11] 4,424,186
[45] Jan. 3, 1984

[54] POWER GENERATION

[75] Inventor: Bruce M. Cook, Plum Borough, Pa.

[73] Assignee: Westinghouse Electric Corp., Pittsburgh, Pa.

[21] Appl. No.: 239,710

[22] Filed: Mar. 2, 1981

[51] Int. Cl.³ ............................................. G21D 3/08
[52] U.S. Cl. ................................... 376/211; 376/217; 376/241
[58] Field of Search ................ 376/211, 241, 216, 217

[56] References Cited

U.S. PATENT DOCUMENTS

| | | | |
|---|---|---|---|
| 3,253,994 | 5/1966 | Kagi | 376/210 |
| 3,255,084 | 6/1966 | Doroszlai | 376/211 |
| 4,104,117 | 8/1978 | Parziale et al. | 376/241 |

Primary Examiner—Harvey E. Behrend
Attorney, Agent, or Firm—D. C. Abeles; Z. L. Dermer

[57] ABSTRACT

Excessive swing of the feedwater in power supply apparatus on the occurrence of a transient is suppressed by injecting an anticipatory compensating signal into the control for the feedwater. Typical overshoot occurs on removal of a large part of the load, the steam flow is reduced so that the conventional control system reduces the flow of feedwater. At the same time there is a reduction of feedwater level in the steam generator because of the collapse of the bubbles under increased steam pressure. By the time the control responds to the drop in level, the apparatus has begun to stabilize so that there is overshoot. The anticipatory signal is derived from the boiling power which is a function of the nuclear power developed, the enthalpy of saturated water and the enthalpy of the feedwater injected into the steam generator. From the boiling power and the increment in steam pressure resulting from the transient are anticipatory increment of feedwater flow is derived. Thus increment is added to the other parameters controlling the feedwater.

11 Claims, 6 Drawing Figures

POWER GENERATION

BACKGROUND OF THE INVENTION

This application relates to power generation and has particular relationship to the control of feedwater flow in the generation of power. In the interest of facilitating the understanding of the invention, it is described as integrated into nuclear reactor power supply apparatus and the claims call for apparatus including a nuclear reactor embodying this invention. To the extent that this invention is applicable to other than nuclear power generation apparatus, such apparatus embodying this invention is intended to be within the scope thereof. The reference to "feedwater flow" or "flow of feedwater" in this application means the time rate at which the feedwater flows; i.e., the number of gallons or liters of feedwater the flows per second or other time unit. Likewise, the reference herein to "steam flow" or "flow of steam" means the time rate at which the steam flows, i.e., the number of cubic feet or cubic meters per unit of time. This application, in the interest of being concrete, refers to feedwater and steam. To the extent that this invention is applicable to power supply apparatus involving other fluids, for example, liquid sodium, such application is within the scope thereof.

Nuclear reactor power generating apparatus includes a nuclear reactor which supplies energy to one or a plurality of steam generators. The generators supply steam to drive a turbine which energizes one electrical generator. Each steam generator has primary tubing, either U-tubes or straight through tubes, which conduct the coolant of the reactor. The primary tubing is in heat-exchange relationship with the feedwater converting the feedwater into steam for the turbine. The spent steam from the turbine is condensed and preheated and returned as feedwater to the steam generator. The feedwater is supplied to each steam generator through a main valve and a by-pass valve, the latter conducting the feedwater when the demand is low. Low demand is defined as 20% to 25% of the maximum or 100% feedwater demand. Each generator has a shell, usually in the form of a hollow cylinder, which divides the generator into an outer region called the downcomer and an inner boiling region. The downcomer contains the feedwater and the feedwater is supplied to it. The level of the feedwater in the downcomer serves as one criterion or measure for determining the demand for feedwater flow. The boiling region contains the steam. Of significance to the control of feedwater flow is the distribution of feedwater fluid both of liquid phase and of the vapor phase between the downcomer and the boiling region. The above description fits power supply with a pressurized water reactor. To the extent that this invention is applicable to supplies of other types, such application is within the scope thereof.

In accordance with the teachings of the prior art the command for controlling the feedwater valves means in accordance with demand is derived by combining the difference between the actual steam flow and the actual feedwater flow and the difference between the level of the liquid in the downcomer and a setpoint. The valve means is so controlled as to tend to maintain the parameters which measure these differences in balance; i.e., the differences at 0.

In the use of power generation apparatus in accordance with the teachings of the prior art substantial overshooting of relatively, long duration has been experienced in the level response of the feedwater. This condition has manifested itself particularly, in the case of large load rejection; by the apparatus; i.e., large decrease in the load in the apparatus. Such large load rejection typically may be the result of a fault in the network supplied by the apparatus.

It is an object of this invention to overcome this disadvantage of the prior art and to provide power generation apparatus in whose use severe overshooting of the feedwater level response shall be suppressed. It is also an object of the invention to provide for controlling the feedwater flow, in power generation apparatus, a method in whose practice the severe overshooting of feedwater shall be suppressed. It is a further object of the invention to provide in power generation apparatus an effective automatic feedwater control from hot shutdown to full power plant operation. The expression "hot shutdown" means the condition of the apparatus being at normal operation temperature but not producing any power. This is the condition of the apparatus just after it is shut down from operating condition. When apparatus is started up, it goes from cold to hot before it is set in operation so that it is in "not shutdown" at startup.

SUMMARY OF THE INVENTION

This invention arises from the realization or discovery of the cause of large overshoot in the level response in case of severe transients such as large load rejection. One effect of load rejection is the decrease in the steam flow. This effect is "seen" first by the feedwater control and the control responds by decreasing the feedwater flow. When large load rejection is experienced there is also substantial power reduction and increase in steam pressure. These effects combine to collapse the bubbles in the boiling region of the steam generator causing the water level in the downcomer to drop. The drop in the level of the downcomer causes the control to call for more feedwater; this occurs in a later stage of the operation following the load rejection. The control is thus under the influence of conflicting controlling parameters; one set calling for a decrease in feedwater flow and the other calling later for an increase in feedwater flow. By the time the control system responds to the low level, the feedwater status has begun to stabilize. The result is the considerable overshoot in the feedwater level response. The duration of the overshoot can be several minutes.

In accordance with this invention an anticipatory factor is introduced into the control. This factor is a signal which provides improved response by determining the change is avoid resulting from the collapsed bubbles and controlling the feedwater valve means accordingly. This signal is derived from the boiling power and from the steam pressure. The void produced by the collapse of the bubbles is proportional to the boiling power or more generally increases and decreases with the boiling power. The boiling power is a function of the nuclear power, the steam pressure and the feedwater flow. It is defined by the equation:

$$BP = K_1 \cdot Q_N - a \cdot (h_3 - h_{fw}) \cdot W_{fw}$$

wherein
 BP = boiling power
 $K_1$ = constant depending on the apparatus under consideration $Q_N$ = the nuclear power $\alpha$ = constant depending on the apparatus $h_s$ = enthalpy of the saturated water; i.e., water which will go to steam if any more energy is added $h_{fw}$ = enthalpy injected into the steam generator of the feedwater $W_{fw}$ = feedwater flow The negative term of the above equation gives the power required to bring the feedwater up to saturation. The positive term is the input power. The difference between the two terms is the power required to bring the saturated water to steam.

The magnitude of the mass redistribution between the boiling region and the downcomer of the steam generator resulting from the transient is derived as a function of the boiling power and the time rate of change of the steam pressure. From the boiling power the mass of M of fluid in the vapor and liquid phases as derived. The change of mass with pressure $\Delta M/\Delta P$ as a result of the transient is also derived. By taking the time differential of the pressure the increment of pressure $\Delta P$ resulting from the transient is derived. The so change of mass with pressure $\Delta M/\Delta P$ is multiplied by the increment of pressure $\Delta P$ to obtain the increment of mass $\Delta M$ resulting from the transient. The increment of mass, $\Delta M$, is added to the mass M derived from the boiling power. The sum $M + \Delta M$ is differentiated with respect to time. The differential is $\Delta W_{fw}$. This increment $\Delta W_{fw}$ is the anticipated instantaneous difference between feedwater flow and steam flow required to maintain the normal water level. This predicted required flow difference, $\Delta W_{fw}$ is compared to the measured flow difference, $W_{fw} - W_s$, to derive the component of the error signal dependent on flow used to control the valve means for the feedwater. Another component added is the error measuring the departure of the measured level of the liquid in the downcomer from a level setpoint. This error is included to insure that the level of the liquid will be at the desired position when the apparatus reaches steady state. The gain in this error is set so that the change in liquid level has a subordinate role in the control of the valve means during a transient. The composite error signal is transmitted to the control of the valve means through a proportional plus integral controller. The proportional component of this controller responds to the error signals instantaneously the integral component extends the response to long-time corrections.

For low-power control of feedwater (hot shutdown to about 20% power) the control according to this invention is integrated into the power generation apparatus with the control disclosed in U.S. Pat. No. 4,104,117 granted Aug. 1, 1978 to Ernest A. Parziale et al. for Nuclear Reactor Power Generations and assigned to Westinghouse Electric Corporation. Parziale et al. is incorporated herein by reference as taught by Parziale et al. the water level error modified by a proportional plus integral controller, is combined with a feedforward signal proportional to nuclear power to control the feedwater flow at low power levels. In the practice of this invention the level error is added to a rate/log compensated nuclear power signal. The sum is applied to the control for the valve means through the proportional plus integral controller. In the practice of this invention a common proportional plus integral controller can serve both for low-power operation as taught by Parziale et al. and for higher power operation. However, the proportional plus integral controller must be the mathematical inverse of the rate/lag controller through which the feedforward nuclear power signal is impressed; i.e., the time constant of the proportional plus integral controller must be about equal to the time constant of the rate/lag controller through which the feedforward signal is impressed.

In the practice of this invention the switching between the low power and the main feedwater control is controlled by a bistable component whose operation depends on the magnitude of nuclear power. The power control tracks an appropriate signal when it is not connected to the rate/lag control so that the switching at low power is "bumpless."

The apparatus according to this invention includes an automatic/manual controller for the feedwater valve means. The valve-demand signal is impressed on this controller. When in the automatic mode, this controller passes the input signal to the output. In the manual mode the controller holds the current output. This output can be raised or lowered by operating pushbuttons which control the valve means. The transfer between the main valve and the bypass valve may be initiated manually; the operator selecting the automatic mode for the valve to be controlled. The transfer may also be initiated automatically when the valve demand signal exceeds or falls below a preset limit. Once a transfer is effected, the transfer mode is be placed in manual to prevent further transfer without operator intervention. The transfer sequence entails placing the appropriate valve in automatic and closing the other valve. When both valves are placed in the manual mode any transfers in progress between the valves is stopped permitting the operator to position either or both valves. When both valves are in the manual mode, the proportional plus integral controller through which the valve demand is impressed tracks a signal so that the mode transfer for either valve used alone is bumpless.

BRIEF DESCRIPTION OF THE DRAWINGS

For a better understanding of the invention, both as to its organization and as to the method of operation, together with additional objects and advantages thereof, reference is made to the following description, taken in connection with the accompanying drawings, in which.

DESCRIPTION OF THE PREFERRED EMBODIMENT

Figure 1:
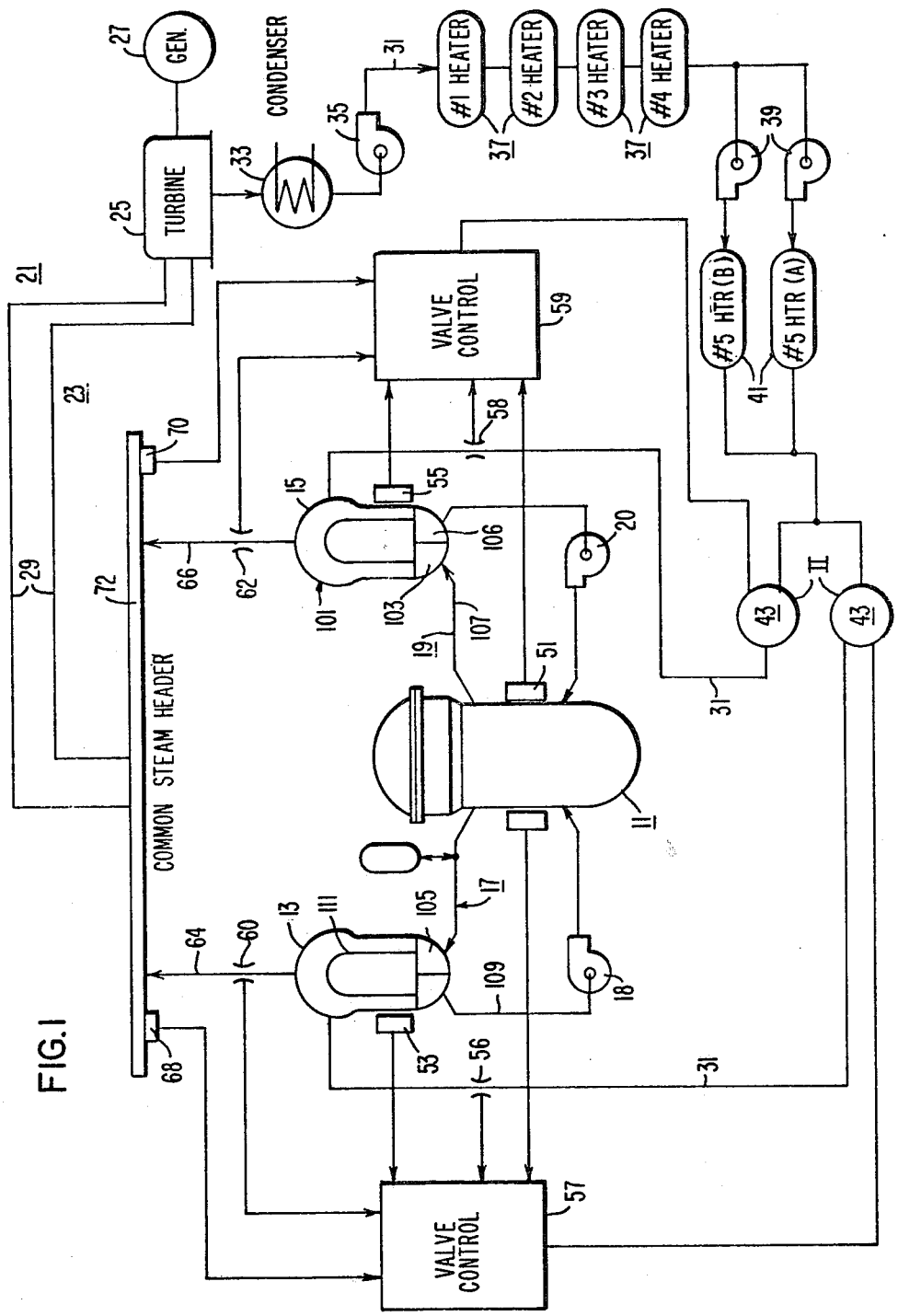
FIG. 1 is a diagrammatic view showing apparatus embodying the invention and which is used to practice the method according to this invention.

The apparatus shown in the drawings is nuclear reactor power-supply apparatus includes a nuclear reactor 11 in thermal heat-exchange relationship with a plurality of steam generators 13 and 15. A primary loop 17 and 19 respectively, each including a pump 18 and 20, thermally interconnect the reactor 11 and each of the generators 13 and 15. Coolant, typically pressurized water, flows through the core (not shown) of the reactor 11 and through each of the generators 13 and 15. The heat derived by each primary loop 17 and 19 from the core vaporizes the water in each generator 13 and 15. A secondary loop 21 and 23 is associated with each generator 13 and 15, respectively.

While this invention is uniquely suitable for steam-driven apparatus, the reference to "water" and "steam" in this application is not intended to limit this invention. To the extent that this invention is applicable to power generators driven by fluids other than water, such application is within the intended scope thereof and the use of words "water" and "steam" in this application and its claims, used in the interest of convenience, is intended to include within its scope such other fluids.

Figure 5:
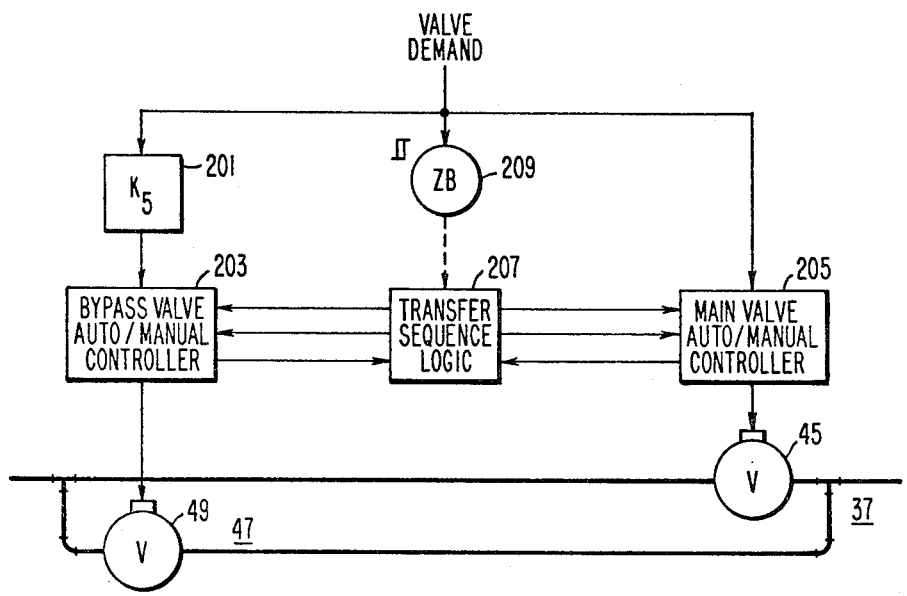
FIG. 5 is a block diagram showing the manner in which the control commands are transmitted to the valve means in the automatic and manual setting of the apparatus according to this invention.

The apparatus shown in the drawings also includes a turbine 25 and an electrical generator 27 driven by the turbine 25. Each secondary loop 21 and 23 includes a first branch 29 for supplying steam from each steam generator 13 and 15 to drive the turbine 25 and a secondary branch 31 for supplying feedwater from the turbine 25 to the corresponding steam generators 13 and 15. Common to the branches 31 is a condenser 33 for condensing the fluid from the turbine 25, a condensate pump 35 and a plurality of heaters 37. Each feedwater branch 31 also includes a feedwater pump 39, a heater 41, and a valve unit 43 (FIG. 5). Each valve unit 43 includes a main valve 45 in the main line. Across this valve 45 there is a by-pass line 47 in which there is a by-pass valve 49. Each by-pass valve 49 has about 20% to 25% of the capacity of the main valve 45 and serves to control the flow of feedwater during low-load levels.

Figure 4:
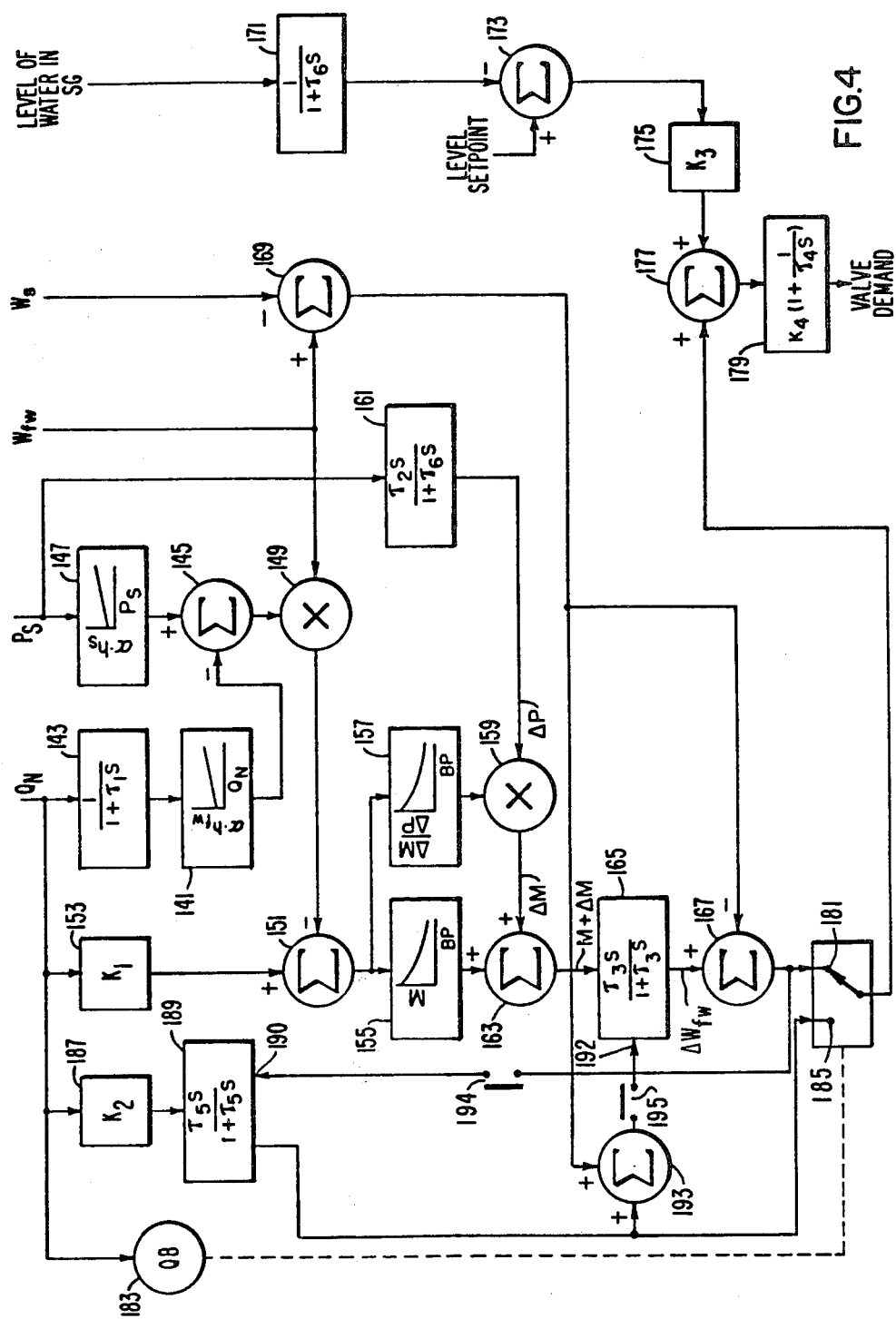
FIG. 4 is a logic schematic of the control embodied in this invention and used in the practice of the method according to this invention.
Figure 6:
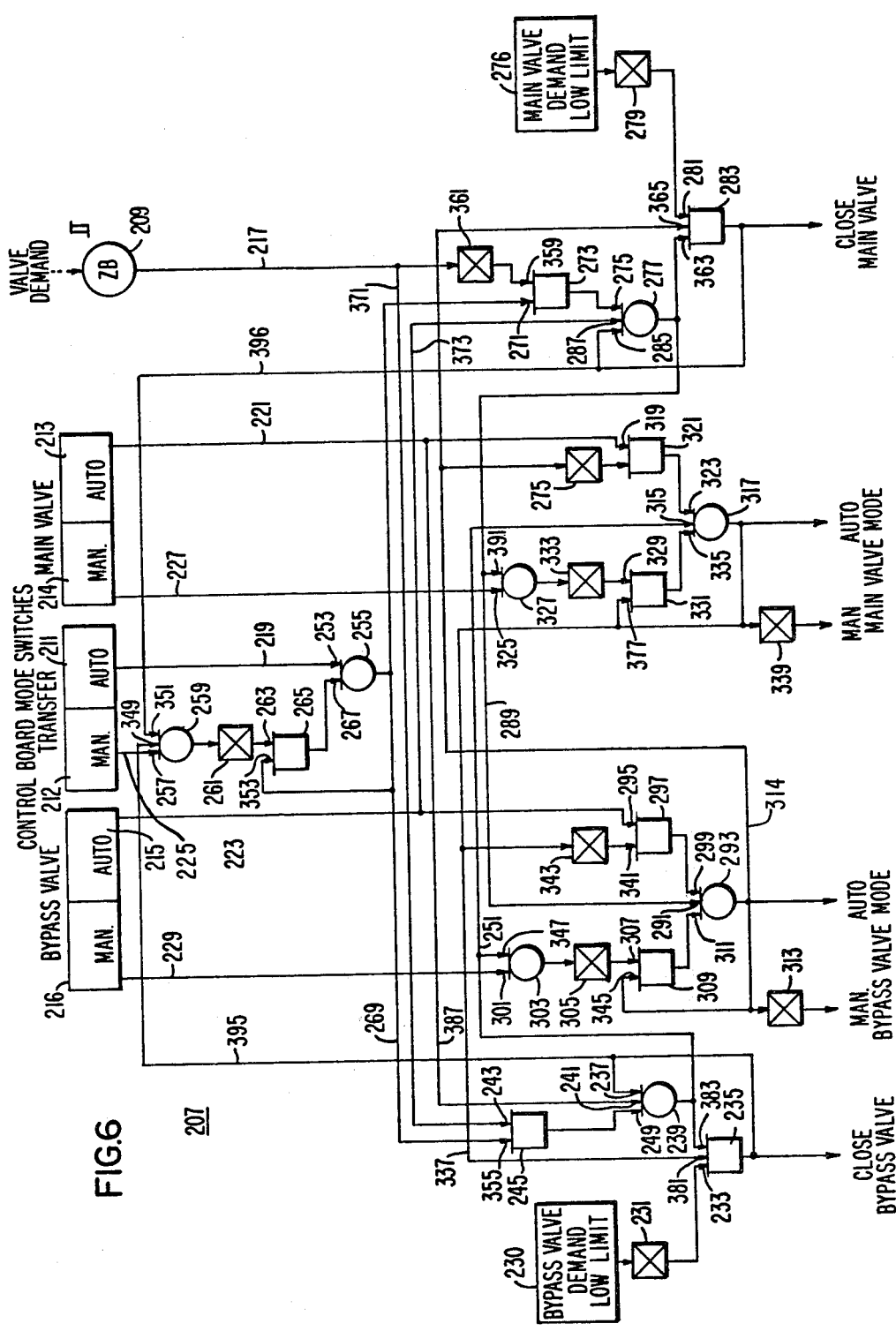
FIG. 6 is a detailed logic schematic of the transfer component of the block diagram shown in FIG. 5.

The nuclear reactor 11 includes conventional sensor 51 for deriving a signal from the neutron flux dependent on the power of the reactor. Each steam generator 13 and 15 includes conventional sensors 53 and 55 for deriving signals dependent on the secondary water level in the steam generators 13-15. There are also a sensor 56 and 58 for deriving signals measuring feedwater flow from the feedwater lines 31, sensors 60 and 62 for deriving signals measuring steam flow typically from the steam lines 64 and 66, and sensors 68 and 70 for deriving steam pressure measurement typically from the steam header 72. The signals from the sensors 51, 53 and 55, 56 and 58, 60 and 62 and 68 and 70 are supplied to respective valve controls 57 and 59 (FIGS. 4, 5, 6). The valve controls 57 and 59 control the valves 45 and 49 in each feedwater line 31.

Figure 2:
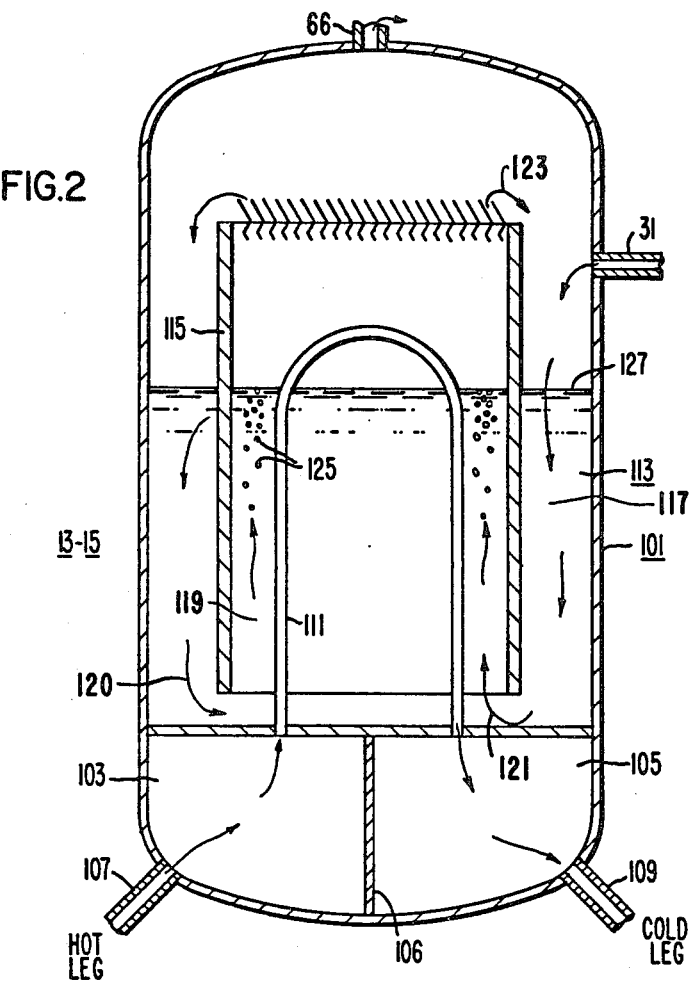
FIG. 2 is a view in longitudinal section predominately diagrammatic showing a steam generator included in the apparatus shown in FIG. 1.

A typical steam generator 13-15 is shown in section in FIG. 2. This steam generator includes a vessel 101 having at the bottom an inlet plenum 103 and an outlet plenum 105. The plenum 103 and 105 are separated by a wall 106. The hot leg 107 of a loop 17 or 19 is connected to the inlet plenum 103 and the cold leg 109 of the loop is connected to the outlet plenum 105. The plenum 103 and 105 are interconnected by a multitude of U-tubes 111 (or straight through tubes) which conduct the coolant through the generator transferring heat to the feedwater 113 to generate steam for driving turbine 25. The feedwater 113 is supplied to the steam generator 13-15 through line 31. The steam generator includes a shell 115 which separates the annular region 117 into which the feedwater flows from the region 119 where the steam is generated. The region 117 is called the downcomer and the region 119 the boiling region, depending on the conditions in the boiling region 119 and in the downcomer 117 the feedwater 113 flows back and forth between these regions as shown by the arrows 120, 121 and 123 through the open bottom of shell 111 and from the steam separators 110.

During operation steam bubbles 125 are produced in the boiling region 119. When there is a considerable loss of load, the pressure of the steam driving turbine 25 increases, collapsing the bubbles, decreasing the volume of fluid in the boiling region 119 so that water from the downcomer 117 flows into the boiling region. The level of the water in the downcomer decreases. In prior art operation the sensors 53 and 55 call for more feedwater. However, the steam flow decreases so that the sensors 60 and 62 call for less feedwater. The sensors 60 and 62 produce the first reaction which is in conflict with the reaction called for by the sensors 53 and 55. As a result of the reaction to sensors 60 and 62, the apparatus in prior art begins to stabilize. It responds to sensors 53 and 55 and a water level overshoot takes place.

Figure 3:
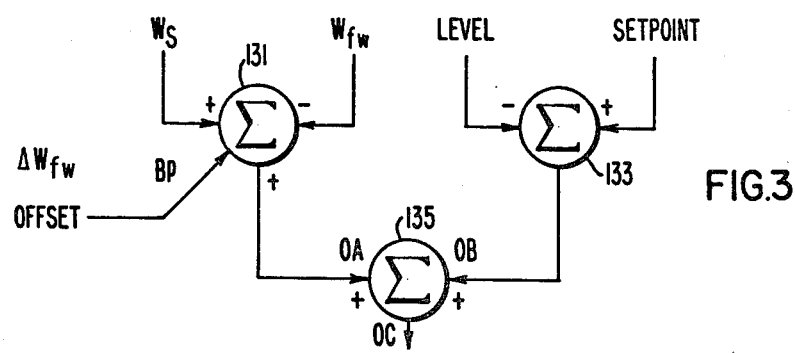
FIG. 3 is a fragmental logic schematic showing how this invention departs from the prior art in producing the control command for the valve means for the feedwater.

The phenomenon is illustrated diagrammatically in FIG. 3. In prior art practice the steam flow, $W_s$, and the feedwater flow, $W_{fw}$, are compared by summer 131. The level 127 of the feedwater in each steam generator is compared to a setpoint by summer 133. The outputs, OA, $W_s - W_{fw}$, and OB, setpoint-level, are added in summer 135. The output OC of summer 135 controls the valve means 47 for feedwater. During normal operation $W_s$ and $W_{fw}$ are balanced and setpoint and level are balanced so that OA and OB are 0. On the occurrence of a considerable load rejection $W_{fw}$ exceeds $W_s$ so that OA is negative and setpoint exceeds level so that OB is positive. There is a conflict. The overshoot is produced when OA becomes negative before OB becomes positive. OA produces a change in one direction and after it starts to take effect OB produces a change in the opposite direction. In accordance with this invention an anticipatory signal $\Delta W_{fw}$ BP dependent on the boiling power is introduced and this suppresses the maloperation. The boiling power is an instantaneous measure of the change in void which is produced in the steam generator and by its use the deficiency in control caused by the change in void can be suppressed.

The determination of the increment $\Delta W_{fw}$ and its contribution to the determination of the valve demand is shown in FIG. 4. The term $\alpha \cdot h_{fw}$ of the both equations for BP is derived from $Q_N$, the nuclear power. $Q_N$ is obtained from sensor 51. The signal $Q_N$ is impressed on function former 141 through filter 143. Filter 143 has a long time constant $\tau_1$ of about 30 seconds. Its purpose is to filter out noise and short transients. The symbol "S"0 is the La Place operator $d/dt$, t being time. This function forms 141 derives $\alpha \cdot h_{fw}$, plotted vertically, as a function of the modification of $Q_N$ passed by filter 143, and plotted horizontally. The negative of the output of function former 141 is impressed on summer 145. The steam pressure $P_s$ is impressed on function forms 147. This function form derives from $P_s$ the term $\alpha \cdot h_s$, plotted vertically, as a function of $P_s$, plotted horizontally. The output of function form 147 is impressed on summer 145. The output of summer 145 is $\alpha \cdot (h_s - h_{fw})$, and is impressed on multiplier 149. The factor $W_{fw}$ is also impressed on multiplier 149. The output of the multiplier is $\alpha \cdot (h_s - h_{fw}) \cdot W_{fw}$. The negative of this product is impressed on summer 151. $Q_N$ multiplied by gain $K_1$ is represented by block 153 is also impressed on summer 151. The output of summer 151 is $K_1 \cdot Q_N - \alpha \cdot (h_s - h_{fw}) \cdot W_{fw}$ or BP.

The output BP of summer 151 is impressed on function former 155. Function former 155 derives from BP the total fluid mass, M, in the steam generator, plotted vertically, as a function of BP, plotted horizontally. The output BP is also impressed on function former 157. This function former derives the coefficient, $\Delta M/\Delta P$, variation of total mass with pressure as a function of BP. BP is plotted horizontally and $\Delta M/\Delta P$ vertically. The output of functional former 157 is impressed on multiplier 159. The steam pressure $P_s$ is impressed on controller 161 which combines a time derivative and a filter. The time constant $\tau_2$ of this controller 161 is about 1 second. The output, $\Delta P$, of this change of pressure per unit time, is impressed on multiplier 159. The output, $\Delta M$, of multiplier 159 is impressed on summer 163 together with the output M of function former 155. Controller 165 is a combined time derivative and filter. The time constant $\tau_3$ of this controller is about 1 second. The output $M + \Delta M$ of summer 163 is impressed in controller 165. The output of the controller is $\Delta W_{fw}$, the anticipated demanded increment in feedwater. This increment $\Delta W_{fw}$ is compared in summer 167 to the actual difference $W_{fw} - W_s$ which is derived through summer 167. The difference $\Delta W_{fw} + W_s - W_{fw}$ is the corrected error which measures the valve demand. However, the level 127 of the feedwater must also be taken into consideration. The level is modified by filter 171 whose time constant $\tau_6$ is about 5 to 10 seconds. The filtered level is compared to a setpoint in summer 173 and multiplied by gain $K_3$ represented by block 175. The gain $K_3$ is low because it is desired that the level play a subordinate role. The difference between the level and the setpoint as modified by gain $K_3$ is impressed on summer 177 where it is added to the increment $\Delta W_{fw}$. The output of summer 177 is impressed in proportional plus integral controller 179. The output of controller 179 is the valve demand.

A switch 181 is provided for switching the logic shown in FIG. 4 between high power and low-power operation. The switch 181 is controlled by bistable 183 that is dependent upon the nuclear power $Q_N$. The bistable 183 operates as a threshold component. In the low power setting only the by-pass valve 49 is controlled. This control is to a large extend as disclosed in Parziale et al. VI. However, in Parziale et al. (FIG. 3), the nuclear power $Q_N$ is injected into summer 63 through filter 83 and the level error is injected through proportional plus integral controller 81. The output of summer 63 is transmitted directly to the auto-manual control station 83. In the apparatus according to this invention the output of summer 177 is transmitted to control the valve means 47 through proportional plus integral controller 179. It is necessary that the output at low-power terminal 185 of switch 181 be matched to the control output for the valve means. The nuclear power $Q_N$ is accordingly for the reason impressed on terminal 185 through $K_2$ gain component 187 and rate/lag controller 189. Controller 189 is the inverse of proportional plus integral controller 179. The time constant $\tau_5$ of controller 189 is about equal to the time constant $\tau_4$ of controller 179; both being about 50 seconds. The gains $K_2$ and $K_4$ are set so that the valve demand has the required gain.

For tracking the rate/lag controller 189 has an input 190 which is supplied from the output of summer 167 through a switch 194 which is closed when the apparatus is in the high-power setting. The output of controller 189 receives this output when switch 181 is in the high-power or high-speed water flow setting and thus setting tracks the high-power output. If the high-power is decreasing and switch 181 is switched to the low-power setting the transition is "bumpless."

When the valve means is in the bypass mode the proportional-plus-integral controller 179 tracks a signal interrelating the main and by-pass demand so that the transition between main mode and by pass mode is "bumpless." For this purpose summer 193 is provided. One input of this summer is derived from the output of the rate/lag controller 189; the other is derived from the output summer 169 which produces the differences between $W_{fw}$ and $W_s$. The output of summer 193 is connected to the controller 165 at input 192 through switch 195 which is closed when the valve is in the low-power bypass setting. The tracking signal is given by Track = Main Demand + $1/K_5 \cdot$ Bypass Demand $K_5$ is the gain represented by block 201 interposed between the valve demand and the bypass valve auto/manual controller 203 (FIG. 5).

The transmission of valve demand commands to the main and bypass valves 45 and 49 is controlled by the bypass valve auto/manual controller 203, (FIG. 5) the main valve auto/manual controller, 205, and the transfer-sequence logic 207 (FIG. 6). The transfer-sequence logic as commanded sets the mode of operation of controllers 203 and 205. The transfer-sequence logic 207 may be controlled automatically from bistable 209 in dependence upon the demand. As indicated the bistable is a threshold component which operates with a hysteresis effect so that repeated stuttering between main-valve mode and by-pass valve mode is precluded.

The logic 207 (FIG. 6) includes transfers switches 211 and 212 for setting the control of the valves 45 and 49 to be carried out automatically or manually, switches 213 and 214 for setting the control of the main valve 45 in automatic or manual modes, and switches 215 and 216 for setting the control of the bypass valve 49 in automatic or manual modes. The switches 211–216 are typically pushbuttons which are instantaneous in operation remaining closed only so long as the button is pressed. In the automatic transfer mode, the switching between the main valve 45 and by-pass valve 49 is controlled by bistable 209 in dependence upon the demand.

The control of the AND, OR, and NOT components in the logic is digital, the inputs and outputs being 1 or 0. When bistable 209 is in the high valve-demand mode there is a 1 on its output and on conductor 217 and when it is in the low valve demand there is a 0 on its output and on conductor 217.

In the standby setting of the apparatus all switches 211–216 are open and they deliver 0 outputs. When any switch is closed it delivers an output of 1. When the apparatus is set in standby the manual switches 212, 214 and 216 are actuated. There are momentarily 1's on conductors 225, 227, and 229. There are 0's on conductors 219, 221, and 223. Valves 45 and 49 are closed. In the absence of any valve demand, there is a 0 on conductor 217. There is a 1 on the output of by-pass valve demand low limit 230. Through NOT 231 there is a 0 on input 233 of AND 235 and a 0 on its output. While the by-pass valve is at this time closed, it is not positively closed by a 1 on the output of AND 237 and is capable of operating.

There is a 0 on input 237 of OR 239. From conductor 221 there is 0 on input 241 of the OR. From conductor 217 there is a 0 on input 243 of AND 245. There is a 0 on its output and on input 249 of OR 239. There is a 0 on the output of OR 239 and on conductor 251. From conductor 219 there is a 0 on input 253 of OR 255. From conductor 225 (momentarily set in Man) there is a 1 on input 257 of OR 259 and through NOT 261 a 0 on input 263 AND 265. There is a 0 on input 267 of OR 255 and a 0 on its output and on conductor 269. Through conductor 269 there is a 0 on input 271 of AND 273 and a 0 on its output and on input 275 of OR 277. At this point main valve demand low limit 276 is at the low limit and there is a 1 on its output and through NOT 279 a 0 on input 281 of AND 283. There is a 0 on the output of AND 283 and on input 285 of OR 277. There is a 0 at the output of OR 277.

From conductor 289 there is a 0 on input 291 of OR 293. There is a 0 on input 295 of AND 297 from conductor 223. There is a 0 on the output of this AND and on input 299 of OR 293. When manual button 216 was maintained closed, a 1 was entered on conductor 229 and on input 310 of OR 303. Through NOT 305 a 0 is entered on input 307 of AND 309. There is a 0 on input 311 of OR 293 and on its output. Through NOT 313, the bypass valve 49 is set for manual control. There is a 0 on conductor 314. From conductor 251 there is a 0 on input 315 of OR 317. From conductor 221 there is a 0 in input 319 of AND 321 and a 0 on its output and on the input 323 of OR 317. From conductor 227, when the button 214 was closed, there is a 1 on input 325 of OR 327, a 1 in its output and 0 on input 329 of AND 331 through NOT 333. There is a 0 on the output of this AND, and on input 335 of OR 317. There is a 0 on the output of OR 317 and on conductor 337. Through NOT 339 the apparatus is set for manual control of the main valve 45.

At the start-up of the apparatus, the operator momentarily actuates the by-pass-valve automatic pushbutton 215. A 1 is momentarily entered on conductor 223. There is a 1 on input 295 of AND 297. From conductor 337, a 1 is entered on input 341 of AND 297 through NOT 343. There is 1 on the output of AND 297, on input 299 of OR 293 and on its output. The setting of the by-pass valve is transferred from manual to automatic and 1 is entered on conductor 314. A 1 is entered on input 345 of AND 309. With a 0 on conductor 229, there is a 0 on input 301 of OR 303. There is also a 0 on its input 347 from conductor 251. There is a 0 on output of OR 303 and through NOT 305 a 1 on input 307 of AND 309. There is a 1 on the output of this AND and on input 311 of OR 293. The by-pass valve is latched into automatic.

From conductor 337 there is a 0 on input 377 of AND 331 and 0 on its output and on input 335 of OR 317. From conductor 251 there is a 0 on input 315 of this OR and from conductor 221, through input 319 of AND 321 and its output, there is a 0 on input 323 of OR 317. There is a 0 in the output of this OR and the main valve is set for manual.

At this point the by-pass valve 49 is closed. But there is a 0 on the output of AND 235 as the by-pass valve demand low limit 230 is below the low limit, and the by-pass valve is capable of being opened responsive to demand. The valve 49 opens and feedwater flows through it.

The main valve demand low limt 276 is below its low limit and a 0 is entered on input 281 of AND 283 through NOT 279. There is a 0 on the output of the AND 283. While the main valve 45 is closed, it was not closed positively by a 1 on the output of AND 283 and this valve is capable of being opened.

Now the transfer pushbutton 211 is momentarily actuated to automatic. A 0 is entered on conductor 225 and on input 257 of OR 259. There is a 0 on inputs 349 and 351 of this OR from conductors 395 and 396. There is a 1 on input 263 of AND 265 through NOT 261. From conductor 219 there is a 1 on input 253 of OR 255. There is a 1 on its output and on input 353 of AND 265. The apparatus is latched into automatic transfer and there is a 1 or conductor 269.

Before the high valve demand is reached, there is a 0 on conductor 217, and on input 243 of AND 245 through conductor 371. There is a 0 on input 249 of OR 239. From conductor 221 there is 0 on input 241 of this OR. There is also a 0 on input 237 of this OR from the output of AND 235. There is a 0 on input 383 of AND 235 and on its output and by-pass valve 49 is capable of continuing to open.

With a 0 on conductor 217 there is a 1 on input 359 of AND 273 through NOT 361. From conductor 269 there is a 1 on input 271 of AND 273 and 1 at its output and on input 275 of OR 277. There is a 1 on input 363 of AND 283. From conductor 314 there is a 1 on input 365 of this AND. However, the main valve demand is at this time below its low limit and there is a 0 in input 281 of AND 283 and on its output.

When the high valve demand is exceeded there is a 1 on conductors 217 and 371 from the bistable 209.

From conductors 269 and 371 there are 1's on inputs 355 and 243 of AND 245. There is a 1 on the output of this AND and on input 249 of OR 239 and on its output. There is a 1 on conductor 251. There is a 1 on input 315 of OR 317 and a 1 on its output. The main valve is set in automatic. There is a 1 on conductor 337 and on input 377 of AND 331. With 0's on conductors 227 and 289, the output of OR 327 is 0 and there is a 1 on input 329 of AND 331. The main valve is latched into automatic. There is also a 1 on input 381 of AND 235 from conductor 337 and a 1 on input 383 from conductor 251. Since the by-pass valve demand is above the low limit, there is a 1 on input 233 of AND 235. The by-pass valve 49 is closed and latched in the closed setting.

There is a 1 on conductor 395 from the output of AND 235. Hence there is a 1 on input 349 of OR 259 and also on its output. Through NOR 261 there is a 0 on input 263 of AND 265 and also on the output of this AND and on input 267 of OR 255, thus breaking the latch of the automatic transfer mode. This feature prevents further valve transfers without operator action.

The main valve 45 now operates to supply feedwater. If during this operation the demand for feedwater should drop below the high valve demand, a 0 is entered on conductor 217. Through conductor 371 a 0 is entered on input 243 of AND 245 and on input 249 of OR 239. A 0 is also entered on input 241 of this OR from conductor 221 through conductor 387. By this time the by-pass valve 49 has reached its lower limit and a 0 is entered on input 233 of AND 235. The latch for OR 239 is broken and a 0 is entered on conductor 251. Conductors 229 and 251 enter 0's on inputs 301 and 347 of OR 303. Through NOT 305 a 1 is entered on input 307 of AND 309. Through NOT 361 a 1 is entered on input 359 of AND 273 and, if the operator has re-established the automatic transfer mode, through conductor 269 a 1 is entered on input 271 of the AND. A 1 is entered on input 275 of OR 277, on its output and on conductor 289. From conductor 289 a 1 is entered on input 291 of OR 293 and through its output on input 345 of AND 309. The by-pass valve is latched in automatic. From conductor 289 a 1 is entered on input 391 OR 327 and on its output. A 0 is entered on input 329 of AND 331 and on input 335 of OR 317. From conductor 251 a 0 is entered on input 315 of this OR. From conductor 221 a 0 is entered on input 319 of AND 321, on its output and on input 323 of OR 317. The output of OR 317 is 0 and the main valve is in manual.

Conductor 314 enters a 1 on input 365 of AND 283 and the output of OR 277 enters a 1 on input 363 of this AND. Since the main valve 45 is at the time set above its low limit a 1 is entered on input 281 of AND 283. A 1 is entered on the output of the AND and the main valve 45 in the closed setting. Again the automatic transfer mode latch 265-255 is broken to prevent further valve transfers without operator action. This time a 1 on conductor 396 and on input 351 of OR 259 causes the break.

Operation of Auto button 213 while the by-pass valve is in automatic, places the main valve in automatic, and closes the by-pass valve. The sequence can be understood from the above description.

This invention can be implemented with standard "off the shelf" analog modules such as the 7300 series manufactured by the Industry Systems Division of Westinghouse Electric Corporation. However, this invention is most readily implemented by digital control technology with a suitable computer or even a microcomputer.

While a preferred embodiment of the invention has been disclosed herein, many modifications thereof are feasible. This invention is not to be restricted except insofar as is necessitated by the spirit of the prior art.

What we claim is:

1. Apparatus for generating power including a nuclear reactor, a turbine to be energized from said reactor, a steam generator, connected to said reactor, for deriving energy therefrom, fluid circulating means, connected to said steam generator and said turbine, said fluid circulating means including a first branch for supplying steam from said steam generator to said turbine to energize said turbine and a second branch for supplying feedwater from said turbine to said steam generator, said feedwater supplied to said steam generator to be converted into steam in said steam generator by the energy supplied to said steam generator by said reactor, valve means in said second branch for controlling the flow of said feedwater to said steam generator, and means, responsive to the magnitude of the boiling power produced by said reactor in said steam generator and to the level of the water in said steam generator, for controlling said valve means in accordance with the demand thereon, and wherein the boiling power, herein BP, is given by the equation:

$$BP = K_1 \cdot Q_N - a \cdot (h_s - h_{fw}) \cdot W_{fw}$$

wherein
  $K_1$ = a gain dependent on the requirement of the apparatus
  $Q_N$ = nuclear power
  $a$ = constant dependent on apparatus
  $h_s$ = enthalphy of saturated water
  $h_{fw}$ = enthalphy of feedwater injected into the steam generator
  $W_{fw}$ = rate of flow of feedwater.

2. The apparatus of claim 1 including a first function former for converting $Q_N$ into $a \cdot h_{fw}$, a second function former for converting the steam pressure, herein $P_s$, into $a \cdot h_s$, a summer for producing the factor $a \cdot (h_s - h_{fw})$, a multiplier for deriving from the feedwater flow, $W_{fw}$, the product $a \cdot (h_s - h_{fw}) \cdot W_{fw}$ and a summer for producing the difference $K_1 \cdot Q_N - a \cdot (h_s - h_{fw}) \cdot W_{fw}$.

3. The apparatus of claim 1 wherein the steam generator has a boiling region and a downcomer, the said apparatus including a function former for converting the boiling power, herein BP, into mass of total fluid in both phases in the steam generator, herein M, means for deriving, from BP, the rate of change of the mass of the fluid in said steam generator, with respect to the steam pressure, herein dM/dP, means for deriving from the steam pressure in said steam generator, herein $P_s$, the change in pressure per unit time herein $\Delta P$, a multiplier for multiplying $\Delta M/\Delta P$, by $\Delta P$ to derive $\Delta M$, a summer for adding the mass of and total fluid in the steam generator and $\Delta M$ to drive $M + \Delta M$, the redistribution of mass between said boiling region and said downcomer of said steam generator, means for deriving the time derivative of $M + \Delta M$, to determine the instantaneous difference between feedwater rate of flow and steam rate of flow, herein $\Delta W_{fw}$, to maintain the nominal water level in said steam generating, a summer for deriving the measured difference between feedwater flow, herein $W_{fw}$, and steam flow $W_s$, means for the difference $\Delta W_{fw} - (W_{fw} - W_s)$ as an error in the feedwater flow and means, responsive to said error, for operating, said valve means to compensate for said error.

4. The apparatus of claim 1 including means for deriving, from the boiling power and from the difference between measurements of the feedwater flow and of the steam flow, an error signal for departure of feedwater level from the required level and means, responsive to said error signal, for setting the valve means to compensate for said error signal.

5. The apparatus of claim 4 including a proportional plus integral controller interposed between the valve means and the error signal deriving means.

6. The apparatus of claim 4 including a summer for adding the error signal and a signal measuring the departure of the level of water in the steam generator from a setpoint, the compensating means being responsive to the sum of said error signal and the departure measuring signal.

7. The apparatus of claim 1 wherein the valve means includes a main valve and a by-pass valve, said by-pass valve inducting feedwater at low rate and said main valve conducting feedwater at higher rates, said controlling means for the valve means including means for automatically transferring the conducting of feedwater between said main valve and said by-pass valve in dependence upon the demand in said valve means.

8. Apparatus for generating power including a nuclear reactor, a turbine to be energized from said reactor, a steam generator, connected to said reactor, for deriving energy therefrom, fluid circulating means connected to said steam generator and to said turbine, said fluid-circulating means including a first branch for supplying steam from said steam generator to said turbine to energize said turbine, and a second branch for supplying feedwater from said turbine to said steam generator, said feedwater, supplied to said steam generator, to be converted into steam by the energy supplied to said steam generator by said reactor, valve means in said second branch for controlling the flow of feedwater to said steam generator, and means responsive to the departure of the level of the water in said steam generator from a setpoint and to the difference between
   (a) the steam flow plus an anticipatory error in the feedwater flow; and
   (b) the feedwater flow, for controlling the demand of said valve means, said anticipatory error being derived from the boiling power and the rate of change of pressure, and wherein the boiling power, herein BP, is given by the equation:

$$BP = K_1 \cdot Q_N - ac \cdot h_s - h_{fs}) \cdot W_{fw}$$

wherein
   $K_1$ = a gain dependent on the requirement of the apparatus
   $Q_N$ = nuclear power
   $a$ = constant dependent on apparatus
   $h_s$ = enthalphy of saturated water
   $h_{fw}$ = enthalphy of feedwater injected into the steam generator
   $W_{fw}$ = rate of flow of feedwater.

9. The apparatus of claim 8 wherein the valve means includes a main valve and a by-pass valve, the by-pass valve conducting the feedwater at low rates and the main valve conducting the feedwater at higher levels and the demand controlling means for the valve means includes means operable automatically to transfer the conducting of feedwater between said main and by-pass valve independence upon the demand of the valve means.

10. In power supply apparatus including a nuclear reactor a turbine to be driven from said reactor, a steam generator, connected to said reactor, for deriving energy therefrom, said steam generator having a boiling region and a downcomer, and fluid circulating connected to said steam generator and to said turbine, said fluid circulating means including a first branch for supplying steam from said steam generator to said turbine and a second branch for supplying feedwater from said turbine to said steam generator;
   the method of controlling the flow of feedwater to said second branch including:
   (a) determining the feedwater flow;
   (b) determining the steam flow;
   (c) determining the nuclear power delivered by said reactor;
   (d) determining the pressure of the steam;
   (e) deriving the boiling power from the determined nuclear power, feedwater flow, and steam pressure, and wherein the boiling power, herein BP, is given by the equation:

$$BP = K_1 \cdot Q_N - a \cdot (h_s - h_{fw}) \cdot W_{fw}$$

wherein
   $K_1$ = a gain dependent on the requirement of the apparatus
   $Q_N$ = nuclear power
   $a$ = constant dependent on apparatus
   $h_s$ = enthalpy of saturated water
   $h_{fw}$ = enthalphy of feedwater injected into the steam generator
   $W_{fw}$ = rate of flow of feedwater;
   (f) deriving from the steam pressure, the increment in pressure produced by any change in the operation of said apparatus;
   (g) deriving from the determined boiling power and increment in pressure at a measure of the mass redistribution between said boiling region and said downcomer resulting from said change in the operation of said apparatus;
   (h) determining the difference between said feedwater flow and said steam flow;
   (i) determining from said determined mass redistribution an anticipatory measure for the incremental feedwater-flow demand resulting from said change in the operation of said apparatus;
   (j) determining the difference between said determined anticipatory incremental feedwater-flow demand and the determined difference between said feedwater flow and said steam flow; and
   (k) changing the flow of feedwater so as to compensate for the said difference between the determined anticipatory incremental feedwater flow demand said determined difference between said feedwater flow and said steam flow.

11. The method of claim 10 including:
   (a) determining the difference between the level of the water in the steam generator and a setpoint;
   (b) adding the said difference to the difference between the determined anticipatory incremental feedwater-flow demand and the determined difference between the feedwater flow and the steam flow to derive an error signal; and
   (c) changing the flow of feedwater so as to compensate for said error signal.

* * * * *